(12) United States Patent
Murty et al.

(10) Patent No.: US 9,850,732 B2
(45) Date of Patent: Dec. 26, 2017

(54) SEAL ASSEMBLY FOR A DOWNHOLE DEVICE

(71) Applicant: RMSpumptools Limited, Oldmeldrum (GB)

(72) Inventors: Jonathan Peter Murty, Aberdeen (GB); Stuart David Gordon, Newmachar (GB)

(73) Assignee: RMSpumptools Limited, Oldmeldrum (GB)

( * ) Notice: Subject to any disclaimer, the term of this patent is extended or adjusted under 35 U.S.C. 154(b) by 434 days.

(21) Appl. No.: 14/405,610

(22) PCT Filed: Jun. 19, 2013

(86) PCT No.: PCT/GB2013/051592
§ 371 (c)(1),
(2) Date: Dec. 4, 2014

(87) PCT Pub. No.: WO2013/190291
PCT Pub. Date: Dec. 27, 2013

(65) Prior Publication Data
US 2015/0139832 A1    May 21, 2015

(30) Foreign Application Priority Data
Jun. 19, 2012   (GB) .................... 1210852.8

(51) Int. Cl.
*F04D 13/10* (2006.01)
*F04D 13/08* (2006.01)
(Continued)

(52) U.S. Cl.
CPC ............ *E21B 33/10* (2013.01); *E21B 33/047* (2013.01); *E21B 43/128* (2013.01);
(Continued)

(58) Field of Classification Search
CPC .... F04D 13/10; F04D 13/021; F04D 13/0693; E21B 17/0423; E21B 17/042;
(Continued)

(56) References Cited

U.S. PATENT DOCUMENTS 2,746,486 A * 5/1956 Gratzmuller ............. F16J 15/04
123/169 R
3,437,149 A * 4/1969 Cugini .................. E21B 17/003
166/379
(Continued)

FOREIGN PATENT DOCUMENTS

EP   0626535 A1   11/1994

OTHER PUBLICATIONS

Written Opinion of the International Searching Authority dated May 13, 2014 for PCT/GB2013/051592.
(Continued)

*Primary Examiner* — Peter J Bertheaud
(74) *Attorney, Agent, or Firm* — Abel Law Group, LLP

(57) ABSTRACT

A sealing assembly for a downhole device has first (12) and second sealing (22) components which are urged together to make up the assembly such that a first sealing surface (34) on the first component radially presses a lip member (44) on the second component to change the angle of a second sealing surface (45) in the connected assembly. The components are urged together by a driving member (60) which can have screw threads that cooperate with the first component. The lip may be annular and may be formed by an undercut or recess (42) radially inwardly or outwardly of the lip member, allowing the lip member to bend radially inwards into the recess, during insertion of the second sealing component into the first.

25 Claims, 3 Drawing Sheets

(51) Int. Cl.
*E21B 33/047* (2006.01)
*E21B 33/10* (2006.01)
*F16L 15/00* (2006.01)
*F04D 13/06* (2006.01)
*E21B 43/12* (2006.01)
*F16L 15/04* (2006.01)
*F16J 15/06* (2006.01)
*E21B 33/00* (2006.01)

(52) U.S. Cl.
CPC ......... *F04D 13/0693* (2013.01); *F04D 13/10* (2013.01); *F16J 15/06* (2013.01); *F16L 15/004* (2013.01); *F16L 15/009* (2013.01); *F16L 15/04* (2013.01); *E21B 2033/005* (2013.01)

(58) Field of Classification Search
CPC .......... E21B 17/04; E21B 33/047; F16L 3/00; F16L 3/12; F16L 3/1211; F16L 3/22; F16L 3/237; F16L 3/26; F16L 39/00; F16L 15/004; F16L 15/009
USPC ........ 417/422, 423.3; 285/110, 123.1, 123.2, 285/332–333; 277/602, 607, 608, 626; 166/382, 387
See application file for complete search history.

(56) References Cited

U.S. PATENT DOCUMENTS

| | | | |
|---|---|---|---|
| 3,730,563 A | 5/1973 | Hanback et al. | |
| 4,009,893 A * | 3/1977 | Schatton | E21B 17/042 285/110 |
| 4,600,054 A * | 7/1986 | Miller | E21B 33/0407 166/65.1 |
| 4,690,221 A * | 9/1987 | Ritter, Jr. | E21B 33/043 166/382 |
| 5,002,316 A | 3/1991 | Chohan | |
| 5,137,306 A * | 8/1992 | Flood | F16L 39/04 285/123.2 |
| 5,193,616 A | 3/1993 | Hynes | |
| 5,282,652 A * | 2/1994 | Werner | F16L 58/182 277/607 |
| 5,372,388 A * | 12/1994 | Gargiulo | F16L 39/00 285/110 |
| 5,829,524 A | 11/1998 | Flanders et al. | |
| 6,530,433 B2 * | 3/2003 | Smith | E21B 33/0407 166/368 |
| 6,688,386 B2 * | 2/2004 | Cornelssen | E21B 33/0407 166/65.1 |
| 9,470,344 B2 * | 10/2016 | Verger | E21B 17/042 |
| 2005/0194126 A1 | 9/2005 | Wang | |
| 2009/0266551 A1 | 10/2009 | Cuiper et al. | |
| 2012/0012332 A1 | 1/2012 | Rooks | |

OTHER PUBLICATIONS

Dantinne, Patrick, "International Search Report," prepared for PCT/GB2013/051592, dated May 13, 2014, five pages.

* cited by examiner

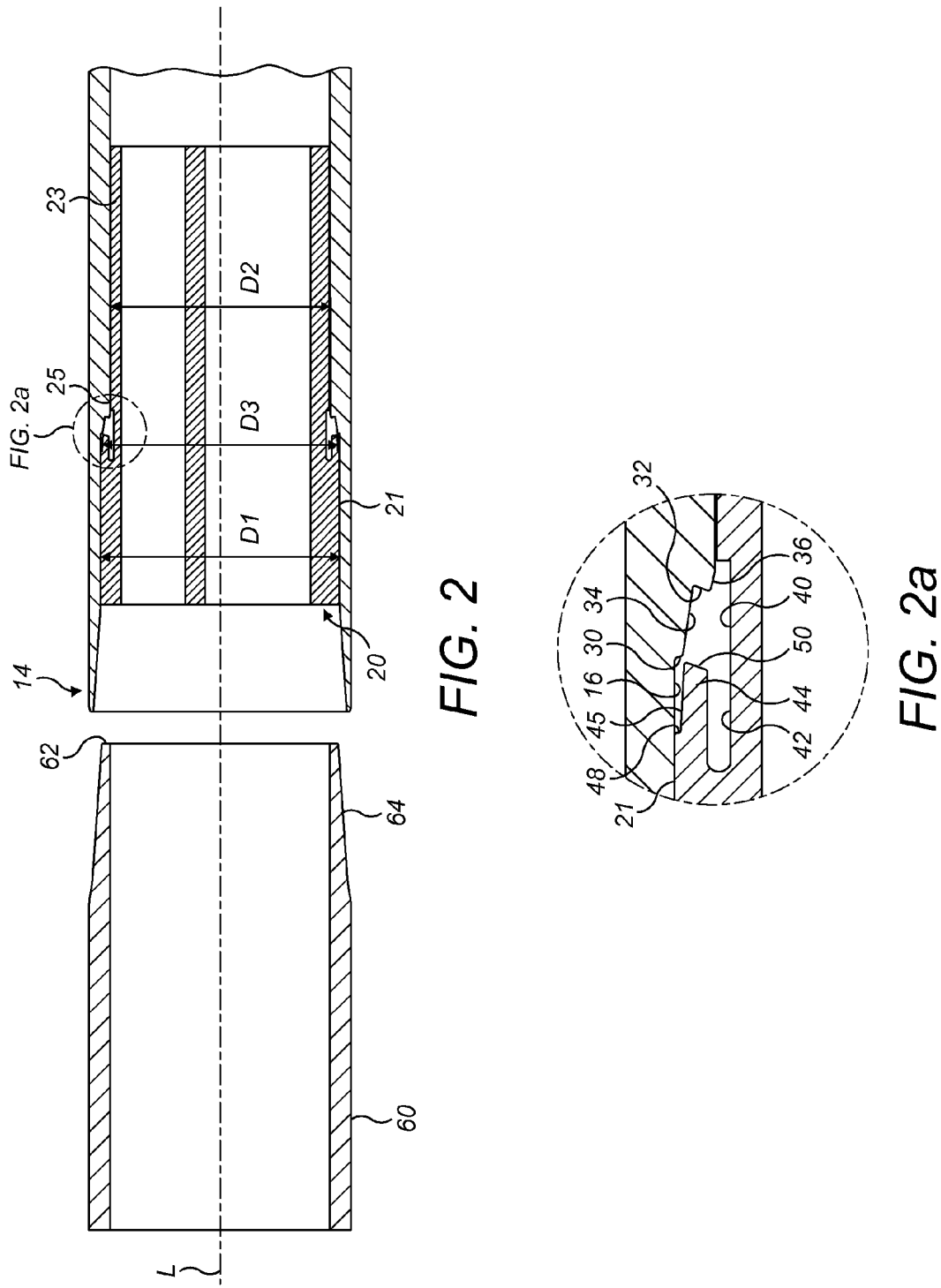

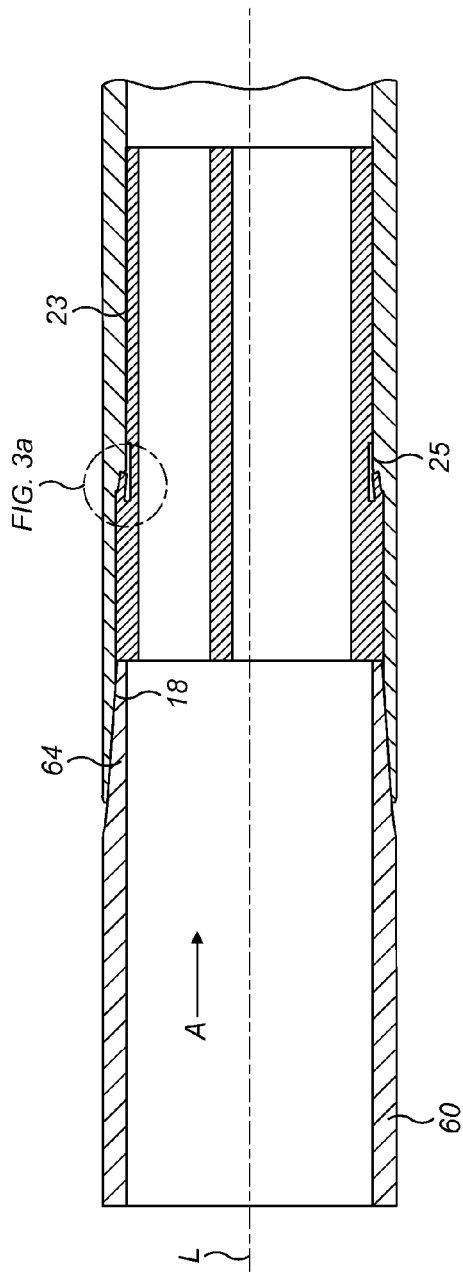
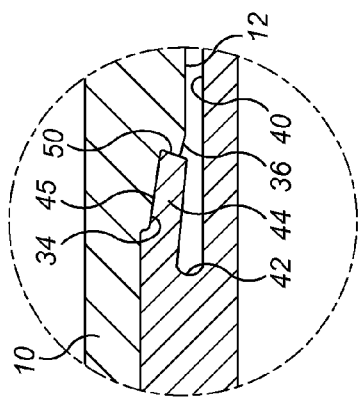

SEAL ASSEMBLY FOR A DOWNHOLE DEVICE

The present invention relates to a seal assembly for a downhole device. The invention is particularly, but not exclusively, suited for sealing a shroud and shroud hanger of an electric submersible pump (ESP).

In downhole processes such as well drilling and completion a number of components are assembled together to form a downhole device or tool. Typically, these individual components must be sealed against one another so that production fluids follow the correct flow path either inside and/or outside the device. Such seals are usually formed using resilient O-rings or gaskets formed from rubber or plastics materials. However, in these downhole environments the extreme pressures and temperatures experienced can lead to accelerated wear and premature failure of such seals.

In addition, existing sealing processes typically use rotational insertion where one or more of the sealing components of a seal assembly is rotated into position. This technique is not suited to use when an ESP or similar tool is hanging from the seal assembly. Neither is it suited to use with sealing components having multiple bores running through them, due to the need to ensure consistent alignment of the bores in each component of the seal assembly.

It is therefore an aim of the present invention to obviate or mitigate one or both of these disadvantages with existing seal assemblies in downhole devices.

According to a first aspect of the present invention there is provided a sealing assembly for a downhole device, the sealing assembly comprising:

- a first sealing component having a longitudinal axis and a recess having a first sealing surface;
- a second sealing component adapted to be received within the first sealing component and having an axially projecting lip member having a second sealing surface;
- wherein when the second sealing component is axially inserted into the first sealing component the second sealing surface lies at a first angle relative to a longitudinal axis, and the first sealing surface is adapted to press the lip member in a radial direction during the insertion, such that the second sealing surface moves to a second angle relative to the longitudinal axis.

The first angle may be substantially zero, wherein the second sealing surface is substantially parallel with the longitudinal axis.

The first sealing surface may lie at the second angle relative to the longitudinal axis, such that the second sealing surface is aligned with the first sealing surface following the insertion of the second sealing component into the first sealing component.

The first sealing surface may be adapted to press the lip member in an inward radial direction. Alternatively, the first sealing surface may be adapted to press the lip member in an outward radial direction.

The assembly may further comprise a driving member having a driving end adapted to drive the second sealing component axially into the first sealing component. The first sealing component has a first end adapted to receive the second sealing component, and the first end and driving end may have mutually engaging threaded portions, wherein rotation of the driving member relative to the first sealing component results in axial movement of the driving member and second sealing component into the first sealing component. The driving member may rotate relative to the second sealing component during the axial movement.

The lip member may be annular. The lip member may be formed by an undercut or recess radially adjacent the lip member. The undercut can be radially inward or outward of the lip member. The lip member may form a cantilever attachment with the second sealing component. The recess or undercut may be provided in an outer surface of the second sealing component, radially juxtaposed between the body of the second sealing component and the lip member, providing free radial space for the lip member to bend radially inwards into the recess, during insertion of the second sealing component into the first.

The lip member may have an outer surface which includes a stop surface projecting radially outwards therefrom, and the recess may have a first abutment surface projecting radially inwards therefrom to engage the stop surface.

The lip member may have a free end having an end surface which, when the second component is inserted into the first component, lies at an oblique angle relative to the longitudinal axis, and the recess may have a second abutment surface projecting radially inwards therefrom to engage the end surface.

Optionally the first sealing component has a conical web between the first and second abutment surfaces, disposed at an oblique angle with respect to the axis of the assembly, which urges the lip member in a radial direction as the first and second components move axially together.

Typically the radial movement of the free end of the lip member urged by the axial movement of at least one of the first and second components towards the other changes the angle of the free end of the lip member, and typically the end surface at the tip of the free end of the lip member moves from a non-parallel arrangement with respect to the second abutment surface into a parallel arrangement with respect to the second abutment surface. Typically the free end surface is non-parallel to the second abutment surface when the second sealing surface is disposed at the first angle, and optionally when the second sealing surface is being inserted into the first sealing component, when the second sealing surface is at the first angle. Typically the end surface and second abutment surfaces are parallel when in contact, after the lip member has engaged the conical web, and has been urged radially (inwards or outwards). Thus the angle between the end surface and the second abutment surface changes during insertion. The second abutment surface may have a chamfer at the end of the second abutment surface closest to the longitudinal axis.

The first and second sealing components may be formed from a non-ferrous metal. The metal may be steel. The steel may be stainless steel or carbon steel. Alternatively, the first and second sealing components may be formed from an alloy. The alloy may be a nickel-chromium alloy. One particular example can comprise Inconel.

The first sealing component may be a shroud for an electric submersible pump, and the second sealing component may be a shroud hanger.

According to a second aspect of the invention there is provided an electric submersible pump comprising:

- a shroud having a longitudinal axis and a recess having a first sealing surface;
- a shroud hanger adapted to be received within the shroud and having an axially projecting lip member having a second sealing surface;
- wherein when the hanger is axially inserted into the shroud the second sealing surface lies at a first angle relative to the longitudinal axis, and the first sealing surface is adapted to press the lip member in a radial direction during axial movement of the shroud hanger into the shroud, such that the second sealing surface moves to a second angle relative to the longitudinal axis.

According to a third aspect of the present invention there is provided a method of forming a seal for a downhole device, the method comprising:

forming a first sealing component having a longitudinal axis and a recess containing a first sealing surface;

forming a second sealing component adapted to be received within the first sealing component, the second sealing component having an axially projecting lip member having a second sealing surface which lies at a first angle relative to the longitudinal axis;

axially inserting the second sealing component into the first sealing component whereupon the first sealing surface presses the lip member in a radial direction such that the second sealing surface moves to a second angle relative to the longitudinal axis.

The first angle may be substantially zero, wherein the second sealing surface is substantially parallel with the longitudinal axis.

The first sealing surface may lie at the second angle relative to the longitudinal axis, such that the second sealing surface is aligned with the first sealing surface following the insertion of the second sealing component into the first sealing component.

The first sealing surface may be adapted to press the lip member in an inward radial direction. Alternatively, the first sealing surface may be adapted to press the lip member in an outward radial direction.

The insertion step may comprise driving the second sealing component into the first sealing component with a driving member having a driving end. The first sealing component has a first end adapted to receive the second sealing component, and the first end and driving end may have mutually engaging threaded portions, wherein rotation of the driving member relative to the first sealing component results in axial movement of the driving member and second sealing component into the first sealing component. The driving member may rotate relative to the second sealing member during the axial movement.

The step of forming the second sealing component may include forming the lip member by making an undercut in the outer surface of the second sealing component.

The various aspects of the present invention can be practiced alone or in combination with one or more of the other aspects, as will be appreciated by those skilled in the relevant arts. The various aspects of the invention can optionally be provided in combination with one or more of the optional features of the other aspects of the invention. Also, optional features described in relation to one aspect can typically be combined alone or together with other features in different aspects of the invention.

Various aspects of the invention will now be described in detail with reference to the accompanying figures. Still other aspects, features, and advantages of the present invention are readily apparent from the entire description thereof, including the figures, which illustrates a number of exemplary aspects and implementations. The invention is also capable of other and different examples and aspects, and its several details can be modified in various respects, all without departing from the spirit and scope of the present invention. Accordingly, the drawings and descriptions are to be regarded as illustrative in nature, and not as restrictive. Furthermore, the terminology and phraseology used herein is solely used for descriptive purposes and should not be construed as limiting in scope. Language such as "including," "comprising," "having" "containing," or "involving" and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes.

Any discussion of documents, acts, materials, devices, articles and the like is included in the specification solely for the purpose of providing a context for the present invention. It is not suggested or represented that any or all of these matters formed part of the prior art base or were common general knowledge in the field relevant to the present invention.

In this disclosure, whenever a composition, an element or a group of elements is preceded with the transitional phrase "comprising", it is understood that we also contemplate the same composition, element or group of elements with transitional phrases "consisting essentially of", "consisting", "selected from the group of consisting of", "including", or is preceding the recitation of the composition, element or group of elements and vice versa.

All numerical values in this disclosure are understood as being modified by "about". All singular forms of elements, or any other components described herein are understood to include plural forms thereof and vice versa. References to directional and positional descriptions such as upper and lower and directions e.g. "up", "down" etc. are to be interpreted by a skilled reader in the context of the examples described and are not to be interpreted as limiting the invention to the literal interpretation of the term, but instead should be as understood by the skilled addressee. In particular, positional references in relation to the well such as "up" will be interpreted to refer to a direction toward the surface, and "down" will be interpreted to refer to a direction away from the surface, whether the well being referred to is a conventional vertical well or a deviated well.

In the accompanying drawings:

FIGS. 2 and 2a show the components of FIG. 1 in an intermediate installation stage; and FIGS. 3 and 3a show the components of FIG. 1 in a final, sealed arrangement following installation.

Figure 1:
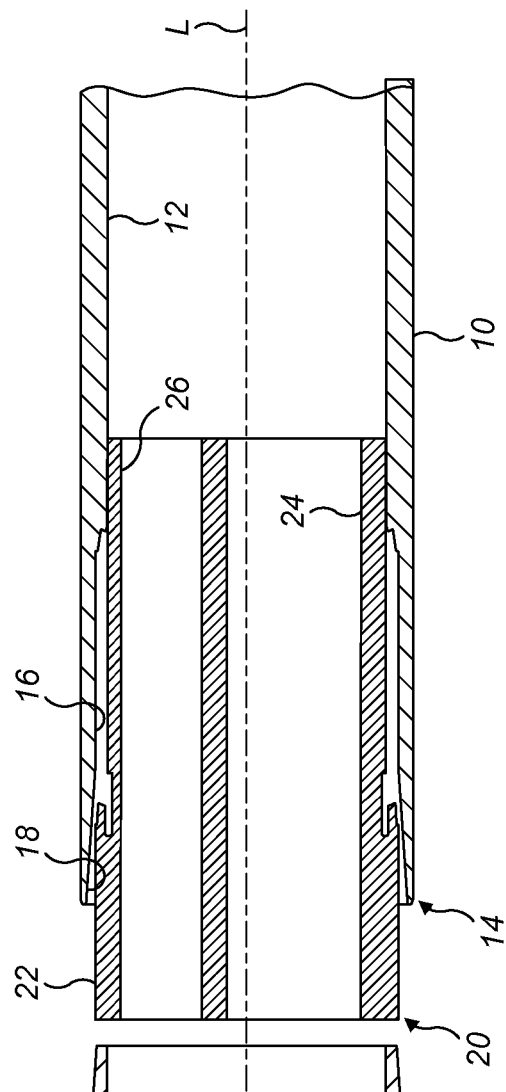
FIG. 1 is a longitudinal section showing the components of a seal assembly for a downhole device.

In the FIG. 1 example, the downhole device with which the present invention is utilised is an electric submersible pump (ESP). However, it should be understood that the invention is not limited to use with this specific device and can alternatively be utilised with various downhole devices.

Referring now to the drawings, the figures show longitudinal sections during the installation of a seal assembly a downhole device, which in this instance is an ESP. A generally cylindrical shroud 10 houses the motor of an ESP (not shown), which is typically deployed within the shroud 10 so that the shroud 10 surrounds the outer surface of the motor. An annulus is formed between an inner surface 12 of the shroud 10 and an outer surface of the motor, thereby accelerating fluid past the motor section and helping to cool the motor.

The shroud 10 has a first, or upper, end 14. The inner surface 12 at this first end 14 is provided with a recess 16, which extends longitudinally from the first end 14 along a portion of the shroud 10. The recess 16 tapers inwardly towards the longitudinal axis L of the shroud 10. In other words, the depth of the recess 16 relative to the inner surface 12 is greatest at the first end 14, with the depth then reducing gradually in the longitudinal direction. The recess 16 includes a threaded portion 18 at the first end 14. As best seen in FIG. 2a, the inward end of the recess 16 ends with first and second abutment surfaces 30,32 which are formed by sudden reductions in the depth of the recess 16. The first abutment surface 30 faces towards the first end 14 of the shroud and is substantially perpendicular to the longitudinal axis L. The second abutment surface 32 is at an oblique angle relative to the longitudinal axis L, and has a chamfer 36 at the end of the surface 32 closest to the longitudinal axis L. Between the first and second abutment surfaces 30,32 the depth of the recess 16 again tapers inwards towards the longitudinal axis L, forming a sealing surface 34 which lies at an oblique angle relative to the axis L.

A shroud hanger 20 is provided for connecting the shroud 10 to associated production tubing (not shown). The shroud hanger 20 has a generally cylindrical body 22 with first and second bores 24,26 extending longitudinally through the body 22. The first bore 24 may have a larger diameter than the second bore. The first bore 24 may be adapted to receive upper and lower lengths of production tubing (not shown). The production tubing may be received in the first bore 24 by providing a threaded inner surface at either end of the first bore 24 so that the respective lengths of tubing can be screwed into either end of the first bore 24. The second bore 26 may be adapted to receive a power cable (not shown) running from the surface to the ESP. Both the shroud 10 and shroud hanger 20 may be formed from a metal. Typically both the shroud 10 and shroud hanger 20 are formed from steel. The shroud 10 and shroud hanger 20 may be formed from a stainless or carbon steel in other examples.

The shroud hanger 20 typically has an upper portion 21 which has a first outer diameter D1, and a lower portion 23 having a second outer diameter D2 which is less than D1. Between the upper and lower portions 21,23 is an intermediate portion 25. Referring once again to FIG. 2a in particular, the intermediate portion 25 has a recess 40 extending circumferentially around the outer surface of the hanger 20. Part of the recess 40 is formed by an undercut 42 extending in the axial direction towards the upper portion 21. This undercut 42 is disposed radially inside a deformable annular lip 44 which surrounds the undercut 42 and projects axially over the recess 40 towards the lower portion 23. The lip 44 has an outer surface 45 whose diameter D3 is less than D1, thereby forming a stop surface 48 where the lip 44 joins the upper portion 21. The diameter D3 may typically reduce in the axial direction towards a free end of the lip 44, whereby the outer surface 45 tapers inwardly towards the longitudinal axis L. The free end of the lip 44 has an oblique end surface 50.

The hanger 20 is installed in the shroud 10 by inserting the lower portion 23 of the hanger 20 in the first end 14 of the shroud 10. The hanger 20 is then pushed axially into the shroud 10 such that the larger diameter upper portion 21 of the hanger 20 engages with the recess 16 inside the shroud 10, reaching the position shown in FIGS. 2 and 2a. The hanger 20 may be pushed further into the shroud by a jacking nut or spin collar 60. The spin collar 60 has a lower engagement surface 62 and an outer threaded portion 64 adjacent the lower engagement surface 62. Once the hanger 20 is located in the shroud as shown in FIG. 2, the spin collar 60 is lowered towards the shroud 10. The collar 60 is then rotated such that the outer threaded portion 64 engages with the thread portion 18 of the shroud recess 16. As the collar 60 is rotated relative to the rotationally-fixed shroud 10, it begins to move axially in the direction of arrow A into the shroud 10. As it does so the lower engagement surface 62 pushes on the top of the hanger 20 and forces the hanger 20 axially further into the shroud 10. There is no coupling between the collar 60 and the hanger 20, so the hanger 20 will slide axially into shroud 10, typically without rotating, whilst the collar 60 rotates.

The outer diameter D2 of the lower portion 23 of the hanger 20 is slightly smaller than the diameter of the inner surface 12 of the shroud, such that a small annular gap is present between the lower portion 23 and the shroud 10. As best seen in FIGS. 2a and 3a, as the collar 60 pushes the hanger 20 further into the shroud 10 the outer surface 45 of the lip 44 comes into contact with the oblique sealing surface 34 formed by the conical web between the abutment surfaces 36 and 32 at the inner end of the shroud recess 16. As can be seen in FIG. 3a, contact between the lip 44 and the oblique sealing surface 34 crimps the lip 44 radially inward toward the longitudinal axis L as the hanger 20 moves axially into the shroud 10. As the lip 44 reaches the end of the recess 16, stop surface 48 and end surface 50 engage with the respective abutment surfaces 30,32 at the end of the recess 16. This engagement of the respective surfaces limits how far the hanger 20 can extend axially into the shroud 10. Once in the fully inserted position shown in FIGS. 3 and 3a, the hanger 20 is secured in place by the collar 60 so that upward axial movement out of the shroud 10 is prevented.

With the hanger 20 fully inserted within the shroud 10, the crimping of the hanger lip 44 against the sealing surface 34 at the end of the recess 16 ensures that any fluid which forces its way into the annular gap between the inner surface 12 of the shroud 10 and the outer surface of the lower hanger portion 23 may not pass the intermediate hanger portion 25. As the hanger 20 is now axially fixed relative to the shroud 10 by the collar 60, any fluid entering the annular recess 40 in the outer surface of the hanger 20 will lead to a build up in pressure within the recess 40. This pressure will be applied to the inner surface of the lip 44 via the undercut 42 and a portion of the lip end surface 50 that is exposed due to the chamfer 36 in the end of the second abutment surface 32. Hence any fluid leaking into the recess 40 between the hanger 20 and shroud 10 cannot pass between the lip 44 and sealing surface 34.

Although the lip 44 is crimped radially, it remains within its elastic limit so that there is no plastic deformation of the lip 44. In this way, the seal can be obtained with repeated use of the hanger 20.

As described above, the FIG. 1 example provides a seal assembly for a downhole device, where the seal assembly provides a fluid-tight metal-to-metal seal between first and second sealing components without the use of any additional seals, gaskets or the like. Furthermore, the FIG. 1 example may include a driving member which is independent of the second sealing component. As a result, the driving member may rotate independently of the second sealing component, so that the second sealing component does not rotate as the driving member drives it into the first sealing component. The second sealing component therefore slides in the axial direction only into the first sealing component, whereupon their respective sealing surfaces meet and the seal is formed. Thus, the present invention may use relatively large second sealing components which are generally more difficult to rotate into position, and may also use second sealing components having multiple bores which cannot be used in installation processes which use rotational insertion.

Whilst in the FIG. 1 example the sealing surface in the recess lies at an oblique angle relative to the longitudinal axis of the shroud the invention is not limited to this arrangement. For example, the sealing surface may instead be substantially parallel with the longitudinal axis and provided with one or more inwardly extending ribs or projections which force the lip towards the longitudinal axis.

Although the first and second sealing components of the FIG. 1 example are formed from steel, they may alternatively be formed from an alloy. For example, they may be formed from a nickel-chromium alloy such as those produced by Special Metals Corporation of New Hartford, USA under the trade mark "Inconel".

The invention claimed is:

1. A sealing assembly comprising:
   a first sealing component in the form of shroud of an electric submersible pump having a longitudinal axis and a recess having a first sealing surface;
   a second sealing component in the form of a shroud hanger of an electric submersible pump adapted to be received within the shroud and having an axially projecting lip member having a second sealing surface; and
   wherein when the shroud hanger is axially inserted into the shroud the second sealing surface lies at a first angle relative to a longitudinal axis, and the first sealing surface is adapted to press the lip member in a radial direction during axial movement of the shroud hanger into the shroud, such that the second sealing surface moves to a second angle relative to the longitudinal axis, and wherein the lip member has an outer surface which includes a stop surface projecting radially outwards therefrom, and the recess has a first abutment surface projecting radially inwards therefrom to engage the stop surface.

2. The sealing assembly of claim 1, wherein the first sealing surface lies at the second angle relative to the longitudinal axis, such that the second sealing surface is aligned with the first sealing surface following axial movement of the shroud hanger into the shroud.

3. The sealing assembly of claim 1, wherein the first sealing surface presses the lip member in an inward radial direction.

4. The sealing assembly of claim 1, including a driving member having a driving end to drive the shroud hanger into the shroud.

5. The sealing assembly of claim 4, wherein the shroud has a first end adapted to receive the shroud hanger, and the first end and driving end have mutually engaging threaded portions, wherein rotation of the driving member relative to the shroud results in axial movement of the driving member and shroud hanger into the shroud.

6. The sealing assembly of claim 1, wherein the lip member is annular.

7. The sealing assembly of claim 1, wherein the lip member is disposed radially adjacent to an undercut on the shroud hanger.

8. The sealing assembly of claim 7, wherein the undercut is radially inside the lip member, leaving a radial spacing between the lip member and a portion of the shroud hanger.

9. The sealing assembly of claim 1, wherein the lip member has a free end having an end surface which, when the shroud hanger is inserted into the shroud, lies at an oblique angle relative to the longitudinal axis, and the recess has a second abutment surface projecting radially inwards therefrom to engage the end surface.

10. The sealing assembly of claim 9, wherein the second abutment surface has a chamfer at the end of the second abutment surface closest to the longitudinal axis.

11. The sealing assembly of claim 1, wherein axial movement of at least one of the shroud and shroud hanger towards the other urges radial movement of a free end of the lip member, which changes the angle of the free end of the lip member with respect to the axis of the assembly.

12. The sealing member of claim 11, wherein the recess has a second abutment surface projecting radially inwards therefrom, and the lip member has an end surface at a tip of the free end of the lip member that moves from a non-parallel arrangement with respect to the second abutment surface into a parallel arrangement and in engagement with respect to the second abutment surface during insertion of the shroud hanger into the shroud.

13. The sealing assembly of claim 12, wherein the shroud comprises a conical web portion between the first and second abutment surfaces, wherein the conical web portion is disposed at an oblique angle with respect to the axis of the assembly, and wherein the conical web portion urges the lip member in a radial direction as the shroud hanger moves axially into the shroud.

14. The sealing assembly of claim 13, wherein the end surface is non-parallel with respect to the second abutment surface when the second sealing surface is disposed at the first angle; and wherein the end surface is parallel with respect to the second abutment surface when the end surface and the second abutment surface are in contact with one another, after the lip member has engaged the conical web, and has been urged in a radial direction.

15. The sealing assembly of claim 1, wherein the shroud and shroud hanger are formed from a non-ferrous metal or metal alloy.

16. An electric submersible pump comprising a sealing assembly as claimed in claim 1.

17. The sealing assembly of claim 1, wherein the lip member forms a cantilever attachment with the shroud hanger.

18. A method of forming a seal for a downhole device, the method comprising:
   forming a first sealing component in the form of shroud of an electric submersible pump having a longitudinal axis and a recess containing a first sealing surface;
   forming a second sealing component in the form of a shroud hanger of an electric submersible pump adapted to be received within the shroud, the second sealing component having an axially projecting lip member having a second sealing surface which lies at a first angle relative to the longitudinal axis;
   axially inserting the shroud hanger into the shroud whereupon the first sealing surface presses the lip member in a radial direction such that the second sealing surface moves to a second angle relative to the longitudinal axis; and
   wherein the lip member has an outer surface which includes a stop surface projecting radially outwards therefrom, and the recess has a first abutment surface projecting radially inwards therefrom to engage the stop surface, and wherein the method includes limiting axial insertion of the shroud hanger into the shroud by engagement of the first abutment surface with the stop surface.

19. The method of claim 18, wherein the first sealing surface lies at the second angle relative to the longitudinal axis, such that the second sealing surface is aligned with the first sealing surface following the insertion of the shroud hanger into the shroud.

20. The method of claim 18, wherein the first sealing surface presses the lip member in an inward radial direction.

21. The method of claim 18, wherein the insertion step comprises driving the shroud hanger into the shroud with a driving member having a driving end.

22. The method of claim 21, wherein the shroud has a first end to receive the shroud hanger, and the first end and driving end have mutually engaging threaded portions, wherein rotation of the driving member relative to the shroud results in axial movement of the driving member and shroud hanger into the shroud.

23. The method of claim 22, wherein the driving member rotates relative to the shroud hanger during the axial movement.

24. The method of claim 23, wherein the shroud hanger is held rotationally static in relation to the driving member during insertion.

25. The method of claim 18, wherein the step of forming the shroud hanger includes forming the lip member by making an undercut in the outer surface of the shroud hanger.

* * * * *